United States Patent [19]

Gillberg-LaForce et al.

[11] Patent Number: 4,913,845

[45] Date of Patent: Apr. 3, 1990

[54] ORGANIC-INORGANIC COMPOSITES WITH ENHANCED NONLINEAR OPTICAL RESPONSE

[75] Inventors: Gunilla E. Gillberg-LaForce, Summit; Garo Khanarian, Berkeley Heights, both of N.J.

[73] Assignee: Hoechst Celanese Corp., Somerville, N.J.

[21] Appl. No.: 295,267

[22] Filed: Jan. 10, 1989

Related U.S. Application Data

[62] Division of Ser. No. 171,088, Mar. 21, 1988, Pat. No. 4,828,758.

[51] Int. Cl.$^4$ ................................................. F21V 9/00
[52] U.S. Cl. .................................... 252/582; 252/584; 252/587; 252/299.5
[58] Field of Search ............... 252/582, 589, 584, 587, 252/299.5

[56] References Cited

U.S. PATENT DOCUMENTS

| | | | |
|---|---|---|---|
| 4,579,915 | 4/1986 | Choe | 525/435 |
| 4,624,872 | 11/1986 | Stuetz | 428/1 |
| 4,717,508 | 1/1988 | DeMartino | 252/583 |

OTHER PUBLICATIONS

Singer, K. D.; Sohn, J. E.; Lalama, S. J.; Appl. Phys. Lett. 49(5), 1986, p. 248.
Willians, D. J., Angew. Chem. Int. Ed. Engl. 23, 1984, 690–703.
JETP Lett., 41 (12), 616, 1985.
Hache, F.; Ricard, D.; Flytzanis, C. J. Opt. Soc. Am. B: Opt. Phys. 3(12), 1647, 1986.
J. Phys. Chem., 91, 634 (1987).
Optics Letters, 10 (No. 10), 511 (1985).
JETP Lett., 41 (No. 12), 615 (1985).
Chem. Phys. Lett., 100 (No. 2), 163 (1983).
J. Opt. Soc. Am. 4, 1035 (1987).
J. Am. Chem. Soc., 109, 3494 (1987).

*Primary Examiner*—John F. Terapane
*Assistant Examiner*—Richard Treanor
*Attorney, Agent, or Firm*—Depaoli & O'Brien

[57] ABSTRACT

In one embodiment this invention provides an nonlinear optical medium which is a composite of a polymer matrix which exhibits nonlinear optic response, and a silver colloid which is dispersed in the polymer matrix.

8 Claims, No Drawings

ORGANIC-INORGANIC COMPOSITES WITH ENHANCED NONLINEAR OPTICAL RESPONSE

This invention was made with Government support under Contract No. F49620-86-C-0129 awarded by the Department of Defense. The Federal Government has certain rights in this invention.

This is a division of application Ser. No. 171,088 filed 3/21/88 now U.S. Pat. No. 4,828,758.

BACKGROUND OF THE INVENTION

It is known that organic and polymeric materials with large delocalized $\pi$-electron systems can exhibit nonlinear optical response, which in many cases is a much larger response than by inorganic media.

Thin films of organic or polymeric materials with large second order nonlinearities in combination with silicon-based electronic circuitry have potential as systems for laser modulation and deflection, information control in optical circuitry, and the like.

Other novel processes occurring through third order nonlinearity such as degenerate four-wave mixing, whereby real-time processing of optical fields occurs, have potential utility in such diverse fields as optical communications and integrated circuit fabrication.

Of particular importance for conjugated organic systems is the fact that the origin of the nonlinear effects is the polarization of the $\pi$-electron cloud as opposed to displacement or rearrangement of nuclear coordinates found in inorganic materials.

It is also known that an electromagnetic mechanism is an important contributor to surface-enhanced Raman scattering (SERS) and related surface optical phenomena. J. Phys. Chem., 91, 634 (1987) reports a method for measuring electromagnetic fields near the surfaces of small metal spheroidal particles to determine field and Raman enhancements for metals.

Optics Letters, 10, (No. 10), 511 (1985) describes surface-mediated enhancement of optical phase conjugation in metal colloids. The enhancement is attributed to the nonlinearities of the electrons in the metal particles, and the optical Kerr coefficients of gold and silver colloids are reported.

JETP Lett, 41 (No. 12), 616 (1985) describes second harmonic and size effects in colloidal metal particles. The publication states that the intensification of nonlinear optical processes at rough metal surfaces results from an increase in the local field due to the excitation of localized surface plasmons. Island films of silver are said to exhibit surface-enhanced Raman scattering, and the generation of a large second harmonic susceptibility.

Chem. Phys. Lett., 100 (No. 2), 163 (1983) reports that colloidal silver, dispersed in ethanol and stabilized with an adsorbed polymer such as polyvinyl pyrrolidone, exhibits enhanced Raman scattering of (N-4-dimethylaminoazobenzene-4'-sulfonyl) aspartate chromophore.

There is an increasing research effort to develop new nonlinear optical organic systems for prospective novel phenomena and devices adapted for laser frequency conversion, information control in optical circuitry, light valves and optical switches. The potential utility of organic materials with enhanced second order and third order nonlinearities for very high frequency application contrasts with bandwidth limitations of conventional inorganic electrooptic materials.

Accordingly, it is an object of this invention to provide novel optical media which exhibit nonlinear optical response.

It is another object of this invention to provide an organic-inorganic composite which exhibits nonlinear optical second order or third order nonlinear optical susceptibility.

It is a further object of this invention to provide a transparent solid composite of a polymer and a metal colloid which exhibits an enhanced nonlinear optical response.

Other objects and advantages of the present invention shall become apparent from the accompanying description and examples.

DESCRIPTION OF THE INVENTION

One or more objects of the present invention are accomplished by the provision of a transparent solid medium which is a composite comprising a polymer which exhibits nonlinear optical response, and which contains a colloidal metal dispersion with an average particle diameter in the range between about 10–1000 angstroms.

The exhibited optical response is a third order nonlinear optical susceptibility $\chi^{(3)}$ when the solid medium has a centrosymmetric macroscopic molecular structure, and is second order nonlinear optical susceptibility $\chi^{(2)}$ when the solid medium has a noncentrosymmetric macroscopic molecular structure.

In another embodiment this invention provides a nonlinear optical medium which is a homogeneous composite comprising (1) a polymer matrix which exhibits nonlinear optical response; and (2) about 0.001–5 weight percent of a metal colloid which is dispersed in the polymer matrix, wherein the metal colloid has an average particle diameter in the range between about 10–1000 angstroms, and has a particle surface plasmon frequency in the range between about 300–800 nm.

In another embodiment this invention provides a transparent solid medium which is a composite comprising (1) a polymer matrix; (2) an organic compound which exhibits nonlinear optical response; and (3) a colloidal metal dispersion with an average particle diameter in the range between about 10–1000 angstroms.

In another embodiment this invention provides a nonlinear optical medium which is a homogeneous composite comprising (1) a polymer matrix; (2) about 5–30 weight percent, based on the composite weight, of an organic compound which exhibits nonlinear optical response; and (3) about 0.001–5 weight percent, based on the composite weight, of a metal colloid which is dispersed in the polymer matrix, wherein the metal colloid has an average particle diameter in the range between about 10–1000 angstroms, and has a particle surface plasmon frequency in the range between about 300–800 nm.

In another embodiment this invention provides a transparent thin film which is a homogeneous composite comprising (1) a polymer matrix which exhibits nonlinear optical response; and (2) about 0.001–5 weight percent of a metal colloid which is dispersed in the polymer matrix, wherein the metal colloid has an average particle diameter in the range between about 10–1000 angstroms, and has a particle surface plasmon frequency in the range between about 300–800 nm.

In another embodiment this invention provides an optical light switch or light modulator device with an optical component which is a composite comprising a polymer which exhibits nonlinear optical response, and which contains a colloidal metal dispersion with an average particle diameter in the range between about 10–1000 angstroms.

In a further embodiment this invention provides an optical light switch or light modulator device with an optical component which is a composite comprising (1) a polymer matrix; (2) an organic compound which exhibits nonlinear optical response; and (3) a colloidal metal dispersion with an average particle diameter in the range between about 10–1000 angstroms.

POLYMER COMPONENT OF COMPOSITES

The polymer component of the invention composites is a thermoplastic or thermoset organic polymer characterized by a nonlinear optical response which is enhanced by plasma resonance on the surfaces of the metal colloid particles which are in proximity to the polymer molecules.

One type of thermoplastic polymer exhibiting nonlinear optical response is a wholly aromatic polymer containing a recurring benzimidazole, benzthiazole or benzoxazole structure, such as poly-2,2'-(m-phenylene)-5,5'-bibenzimidazole, poly[benzol(1,2-d:4,5-d')bisthiazole-2,6-diyl]-1,4-phenylene, poly[benzol(1,2-d:4,5-d')bisoxazole-2,6-diyl]-1,4-phenylene), and the like, as disclosed in U.S. Pat. Nos. 4,423,202; 4,225,700; 4,463,167; 4,487,735; and 4,579,915.

Another type of suitable thermoplastic polymer is illustrated by a polyacetylenic structure as disclosed in U.S. Pat. No. 4,605,869, which is characterized by the repeating unit:

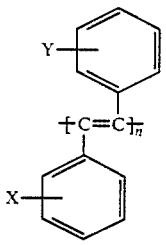

where Y is an electron-withdrawing substituent such as nitro or cyano; X is an electron-donating substituent such as dialkylamino or alkoxy, and n is an integer of at least 3.

Another type of suitable thermoplastic polymer is illustrated by a recurring monomeric unit corresponding to the formula:

where P' is a polymer main chain unit, S' is a flexible spacer group having a linear chain length of between about 0–20 atoms, M' is a pendant group which exhibits nonlinear optical response, and where the pendant groups comprise at least about 10 weight percent of the polymer.

Polymers corresponding to the above formula are disclosed in U.S. Pat. No. 4,694,066, such as poly[6-(4-nitrobiphenyloxy)hexyl methacrylate]; poly/4-[N-(2-methacroyloxyethyl)-N-methylamino]-4'-nitrostilbene/; poly [4-(4-methacroyloxypiperidyl)-4'-nitrostilbene]; and the like.

Other applicable thermoplastic polymers are the electrical conductive polymers described in SPIE, 682, 77 (1986), and in Macromolecules, 20, 2023 (1987).

Suitable thermoset polymers are illustrated by compositions which are prepared by polymerization of bisacrylate monomers corresponding to the formula:

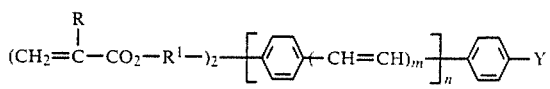

where R is a $C_1$–$C_4$ alkyl substituent, $R^1$ is a divalent $C_2$–$C_{12}$ alkylene radical, m is an integer with a value of 0–2, n is an integer with a value of 0–1, and Y is an electron-withdrawing substituent such as nitro, cyano or trifluoromethyl.

GUEST-HOST ORGANIC COMPONENT OF COMPOSITES

The organic component of the invention composites can be a guest-host mixture which exhibits nonlinear optical response.

In one type of transparent guest-host matrix, the polymer constituent does not exhibit nonlinear optical response, while the guest constituent exhibits a high level of nonlinear optical response, such as a homogeneous solid solution of polymethyl methacrylate or polyvinyl chloride with a guest compound such as 4-nitroaniline, 2-methyl-4-nitroaniline or 4-N,N-dimethylamino-4'-nitrostilbene; or a guest compound such as 13,13-di(n-hexadecylamino)-14,14-dicyano-4,5,9,10-tetrapyrenoquinodimethane or other quinodimethane compound as disclosed in U.S. Pat. No. 4,659,177.

In another type of transparent guest-host matrix, both the guest and host constituents exhibit nonlinear optical response, such as a homogeneous solid solution of host (4-nitrophenyl)-substituted poly-2,2'-(m-phenylene)-5,5'-bibenzimidazole (as disclosed in U.S. Pat. No. 4,579,915) with guest 4-N,N-dimethylamino-4'-nitrostilbene.

Of particular interest for purposes of the present invention is a guest constituent which has an extended conjugated unsaturation structure, and which exhibits third order nonlinear optical susceptibility $\chi^{(3)}$. Illustrative of this $\chi^{(3)}$ responsive type of molecular structure are polythiophene oligomers, phthalocyanine and naphthalocyanine dyes, and structures such as β-carotene which are described in J. Opt. Soc. Am., 4, 1035 (1987).

METAL COLLOID COMPONENT

The incorporation of the metal colloid in an invention composite is for the purpose of enhancing the nonlinear optical response of the organic matrix.

The enhancing effect increases as the content of the metal colloid component in a composite increases.

Metal colloids which can provide the nonlinear optical enhancement effect include silver, gold, platinum, nickel, palladium, rhodium, iridium, copper, aluminum, gallium, zinc and cadmium.

Metal derivatives are also suitable as the metal colloid. A preferred type of metal derivative is a metal cluster, such as the 38-atom cluster $(Ph_3P)_{12}Au_{18}Ag_{20}Cl_{14}$ disclosed in J. Am. Chem. Soc., 109, 3494 (1987).

Metal colloids which exhibit the desired nonlinear optical enhancement effect generally are characterized by a particle surface plasmon frequency in the range between about 300–600 nm.

The term "plasmon" as employed herein is defined in "Introduction To Solid State Physics", by C. Kittel; third Edition, John Wiley & Sons, Inc., New York.

A plasmon is a quantized plasma oscillation. A plasma oscillation is a collective longitudinal excitation of an electron gas in a colloid particle.

Optics Letters, 10 (No. 10), 511 (1985) describes surface-mediated enhancement of optical phase conjugation in metal colloids. The optical phase-conjugated reflectivity from silver and gold colloids is enhanced by several orders of magnitude. The reflectivity during resonance is comparable with that of carbon disulfide for a metal particle volume concentration of a few parts per million. The optical enhancement is attributed to the nonlinearities of the electrons in the metal colloid particles.

The amplitude of the electric field induced at the surface of a spherical metallic particle of diameter d by an oscillating electromagnetic field of wavelength $\lambda(>>d)$ exhibits a dramatic enhancement at the surface plasmon frequency $\Omega_s$, which is fixed by the condition $$\epsilon_m'(\Omega_s) + 2\epsilon_d(\Omega_s) = 0$$

where $\epsilon_m = \epsilon_m' + i\epsilon_m''$ is the dielectric constant of the metallic particle and $\epsilon_d$, real, is that of the surrounding dielectric. This surface-mediated enhancement of the electromagnetic field is the main cause of the increase of the effective cross sections of optical effects emanating from molecules in the dielectric at or close to a rough metallic surface (Raman scattering, second-harmonic and third-harmonic generation). The effect is reduced in proportion to the distance of the molecules from the center of the metal particle.

A colloid metal dispersion for utilization in the preparation of an invention composite preferably is in the form of a metal organosol. As illustrated in the Examples, a composite can be prepared by blending a metal organosol with a solvent solution of a nonlinear optically active organic polymer, and using the blended mixture to form a transparent film on a substrate.

Methods of metal colloid preparation are described in U.S. Pat. No. 3,180,835; U.S. Pat. No. 3,814,696; J. Macromol. Sci. Chem., A13, 633 (1979); Chem. Phys. Lett., 100 (No. 2), 163 (1983); and The Physics and Fabrication of Microstructures and Microdevices, Proceeding of the Winter School Les Houchis, France, Mar. 25–Apr. 5, 1986; pages 331–342; Springer-Verlag, New York.

NONLINEAR OPTICAL PROPERTIES

The fundamental concepts of nonlinear optics and their relationship to chemical structures can be expressed in terms of dipolar approximation with respect to the polarization induced in an atom or molecule by an external field.

The fundamental equation (1) below describes the change in dipole moment between the ground state $\mu_g$ and an excited state $\mu_e$ expressed as a power series of the electric field E which occurs upon interaction of such a field, as in the electric component of electromagnetic radiation, with a single molecule. The coefficient $\alpha$ is the familiar linear polarizability, $\beta$ and $\gamma$ are the quadratic and cubic hyperpolarizabilities, respectively. The coefficients for these hyperpolarizabilities are tensor quantities and therefore highly symmetry dependent. Odd order coefficients are nonvanishing for all structures on the molecular and unit cell level. The even order coefficients such as $\beta$ are zero for those structures having a center of inversion symmetry on the molecular and/or unit cell level.

Equation (2) is identical with (1) except that it describes a macroscopic polarization, such as that arising from an array of molecules in an isotropic polymer domain:

$$\Delta\mu = \mu_e - \mu_g = \alpha E + \beta EE + \gamma EEE + \quad (1)$$

$$P = P_0 + \chi^{(1)}E + \chi^{(2)}EE + \chi^{(3)}EEE + \quad (2)$$

Light waves passing through an array of molecules can interact with them to produce new waves. This interaction may be interpreted as resulting from a modulation in refractive index or alternatively as a nonlinearity of the polarization. Such interaction occurs most efficiently when certain phase matching conditions are met, requiring identical propagation speeds of the fundamental wave and the harmonic wave. Birefringent crystals often possess propagation directions in which the refractive index for the fundamental $\Omega$ and the second harmonic $2\Omega$ are identical so that dispersion may be overcome.

The term "phase matching" as employed herein refers to an effect in a nonlinear optical medium in which a harmonic wave is propagated with the same effective refractive index as the incident fundamental light wave. Efficient second harmonic generation requires a nonlinear optical medium to possess propagation directions in which optical medium birefringence cancels the dispersion as a function of wavelength, i.e., the optical transmission of fundamental and second harmonic frequencies is phase matched in the medium. The phase matching can provide a high conversion percentage of the incident light to the second harmonic wave.

For the general case of parametric wave mixing, the phase matching condition is expressed by the relationship:

$$n_1\Omega_1 + n_2 10 6_2 = n_3\Omega_3$$

where $n_1$ and $n_2$ are the indexes of refraction for the incident fundamental radiation, $n_3$ is the index of refraction for the created radiation, $\Omega_1$ and $\Omega_2$ are the frequencies of the incident fundamental radiation and $\Omega_3$ is the frequency of the created radiation. More particularly, for second harmonic generation, where $\Omega_1$ and $\Omega_2$ are the same frequency $\Omega$, and $\Omega_3$ is the created second harmonic frequency $2\Omega$, the phase matching condition is expressed by the relationship:

$$n_\Omega = n_{2\Omega}$$

where $n_\Omega$ and $n_{2\Omega}$ are indexes of refraction for the incident fundamental and created second harmonic light waves, respectively. More detailed theoretical aspects are described in "Quantum Electronics" by A. Yariv, chapters 16–17 (Wiley and Sons, New York, 1975).

A present invention solid composite medium typically has excellent optical transparency and exhibits hyperpolarization tensor properties such as second harmonic and third harmonic generation, and the linear electrooptic (Pockels) effect. For second harmonic generation, the bulk phase of the solid composite medium does not possess a real or orientational average inversion center. The medium has a macroscopic noncentrosymmetric structure.

Harmonic generation measurements relative to quartz can be performed to establish the value of second order and third order nonlinear susceptibility of the optically clear substrates.

In the case of macroscopic nonlinear optical media that are composed of noncentrosymmetric sites on the molecular and domain level, the macroscopic second order nonlinear optical response $\chi^{(2)}$ is comprised of the corresponding molecular nonlinear optical response $\beta$. In the rigid lattice gas approximation, the macroscopic susceptibility $\chi^{(2)}$ is expressed by the following relationship:

$$\chi_{ijk}(-\Omega_3; \Omega_1, \Omega_2) = Nf^{\Omega_3}f^{\Omega_3}f^{\Omega_6} 1 < \beta_{ijk}(-\Omega_3; \Omega_1, \Omega_2)>$$

wherein N is the number of sites per unit volume, f represent small local field correlations, $\beta_{ijk}$ is averaged over the unit cell, $\Omega_3$ is the frequency of the created optical wave, and $\Omega_1$ and $\Omega_2$ are the frequencies of the incident fundamental optical waves.

A nonlinear optical composite medium with a centrosymmetric configuration of organic molecules as defined herein can exhibit third order nonlinear optical susceptibility $\chi^{(3)}$ of at least about $1 \times 10^{-13}$ esu as measured at 1.91 $\mu$m excitation wavelength.

A nonlinear optical composite medium with an external field-induced noncentrosymmetric configuration of organic molecules as defined herein can exhibit second order nonlinear optical susceptibility $\chi^{(2)}$ of at least about $1 \times 10^{-8}$ esu as measured at 1.06 $\mu$m excitation wavelength.

These theoretical considerations are elaborated by Garito et al in chapter 1 of the ACS Symposium Series 233 (1983); and by Lipscomb et al in J. Chem., Phys., 75, 1509 (1981), incorporated by reference. See also Lalama et al, Phys. Rev., A20, 1179 (1979); and Garito et al, Mol., Cryst. and Liq. Cryst., 106, 219 (1984); incorporated by reference.

EXTERNAL FIELD-INDUCED SIDE CHAIN ORIENTATION

The term "external field" as employed herein refers to an electric, magnetic or mechanical stress field which is applied to a medium of mobile organic molecules, to induce dipolar alignment of the molecules parallel to the field.

The nonlinear optically responsive organic polymer and/or guest compound of an invention composite may be aligned by the application of an external field to a mobile matrix of the nonlinear optically active molecules. Application of a DC electric field produces orientation by torque due to the interaction of the applied electric field and the net molecular dipole moment of the organic molecules. The molecular dipole moment is due to both the permanent dipole moment (i.e., the separation of fixed positive and negative charge) and the induced dipole moment (i.e., the separation of positive and negative charge by the applied field).

Application of an AC electric field also can induce bulk alignment. In this case, orienting torque occurs solely due to the interaction of the applied AC field and the induced dipole moment. Typically, AC field strengths exceeding 1 kV/cm at a frequency exceeding 1 KHz are employed.

Application of a magnetic field also can effect alignment. Organic molecules do not possess a permanent magnetic dipole moment. In a manner analogous to AC electric field, a magnetic field can induce a net magnetic dipole moment. Torque results from the interaction of the induced dipole moment and the external magnetic field. Magnetic field strengths exceeding 10 Kgauss are sufficient to induce alignment of mobile molecules.

Mechanical stress induced molecular alignment is applicable to the nonlinear optically active polymers and/or guest compounds. Specific mechanical stress methods include stretching a thin film, or coating a surface with an aligning polymer such as nylon. Physical methods (e.g., stretching) rely upon the rigid and geometrically asymmetric character of the organic molecules to induce bulk orientation. Chemical methods (e.g., coating the surface with an aligning polymer) rely upon strong intermolecular interactions to induce surface orientation.

Application of an AC electric, magnetic or mechanical external field produces colinear molecular alignment in which the molecular direction (either parallel or antiparallel to the orientation axis) is statistically random, and the resultant molecularly oriented medium exhibits third order nonlinear optical susceptibility $\chi^{(3)}$. Application of a DC electric external field produces colinear molecular alignment in which the molecular direction is not random, and is characterized by a net parallel alignment of molecular dipoles. The resultant molecularly oriented medium exhibits second order nonlinear optical susceptibility $\chi^{(2)}$.

The orientation of the organic molecules is accomplished when the molecules are in a mobile phase, e.g., the molecules are at a temperature near or above the polymer glass transition temperature. The aligned phase of the mobile molecules can be frozen by cooling the medium below the polymer glass transition temperature while the aligned phase is still under the influence of the applied external field.

The following examples are further illustrative of the present invention. The components and specific ingredients are presented as being typical, and various modifications can be derived in view of the foregoing disclosure within the scope of the invention.

EXAMPLE I

This Example illustrates the preparation of polymer/metal colloid composites with enhanced nonlinear optical response in accordance with the present invention.

A. Preparation of metal organosols

The general procedure for the preparation of metal organosols described in J. Macromol. Sci. Chem., A13, 633 (1979) and Chem. Phys. Let. 100, 163 (1983) is employed.

A 150 mg quantity of AgNO$_3$ dissolved in 5 ml of Millipore ® water is added slowly to a stirred solution of 1 g of polyvinylpyrrolidone (MW 10,000) in 500 ml of absolute ethanol. The stirred solution is heated and refluxed for 20 minutes and then cooled. Transmission electron microscopy examinations indicate silver particle sizes in the range of 25–150 Å, with most particles having a size of about 55 Å. Predissolving the silver salt in water results in a narrower particle size distribution.

Following the same procedure, a gold organosol is prepared from AuCl$_3$ starting material.

B. Preparation of polybenzimidazole dope

Polybenzimidazole (M.W. 201,000) is dissolved in hot dimethylacetamide with stirring over a period of 4 hours to provide a 5% by weight solution. The solution is filtered through a 0.5 μm filter.

C. Preparation of metal colloid-containing polybenzimidazole films (1) A control sample of polybenzimidazole film is spin-coated onto a clean glass slide at 3000 rpm for 20 seconds, and then is baked at 60° C. overnight with purging. The film thickness is 0.91 μm, as determined with a Dektak II profiliometer.

(2) One part of silversol as prepared above is added to nine parts of a solution of 1 g of polyvinylpyrrolidone in 500 ml of ethanol. A 0.14 ml aliquot of the formed solution is added to 3 ml of 5% by weight polybenzimidazole solution in dimethylacetamide. The admixture is sonicated for 30 seconds at 50% duty cycle and power level 2 with a Heat Systems-Ultrasonics, Inc. W-375 microprobe. The resultant solution is spin-coated onto glass (3000 rpm, 20 seconds). The prepared film has a silver colloid content of 1.7 ppm by weight, and a thickness of 0.89 μm.

The film exhibits a resonance enhanced third harmonic generation (THG) (using an incident laser irradiation of 1.2 μm wavelength), which is 30% higher than that of a control polybenzimidazole film of equal thickness and without a colloid content.

Following the same procedures, a similar film is prepared with a 3 ppm by weight content of gold colloid, and a thickness of 0.9 μm. The film exhibits a 50% enhanced THG as compared to a control film sample without a colloid content.

(3) A 0.14 ml quantity of silversol is added to 3 ml of the 5% by weight solution of polybenzimidazole, and a film is prepared which has a silver content of 17 ppm by weight, and a thickness of 0.82 μm. The film exhibits a 70% enhanced THG response as compared to a control film sample.

A film with a gold content of 30 ppm by weight and a thickness of 0.9 μm is prepared with the same spin-coating procedure.

(4) A portion of silversol is concentrated 20 fold by evaporation of ethanol. A 0.14 ml quantity of the concentrated solution is added to 3 ml of 5% by weight polybenzimidazole solution, and a film is prepared by spin-coating as described above. The film has a silver content of 0.34% by weight, and a thickness of 0.91 μm. The film exhibits a resonance enhanced THG which is 5 times larger than that of a control film sample.

Following the same procedure, a film is prepared with a gold content of 0.61% by weight and a thickness of 0.9 μm.

EXAMPLE II

An oligomeric polythiophene with a molecular of 3000–4000 is dissolved in acetonitrile to a concentration of 4% by weight, and then filtered through a 0.5 μm filter. A silversol solution prepared in accordance with Example I is added to solution portions to provide samples with different contents of silver colloid.

The colloid solutions after sonication are spin coated onto glass plates at 3000 rpm for 20 seconds, and baked at 60° C. for about 18 hours. The thickness of the film samples is 0.16 μm. Resonance enhanced $\chi^{(3)}$ is measured using a laser radiation of 1.34 μm wavelength.

The sample containing 0.1% of silver colloid exhibits a THG enhancement of 2.5 over that of a control polythiophene film without a colloid content. Another sample with 0.2% of silver colloid exhibits a fivefold enhancement of THG response as compared to a control sample of polythiophene.

EXAMPLE III

Bis(tri-n-hexylsiloxy)silicon naphthalocyanine dye (as described in patent application Ser. No. 698,206) is dissolved in trichloropropane to a concentration of 5% weight. The solution is filtered through a 0.5 μm filter to remove any undissolved material.

A silver colloid with an average particle size of 7 nm is added to provide a concentration of 1.2% solids. The solution is spin-coated onto a glass plate at 1000 rpm for 60 seconds, and baked at 60° C. for about 18 hours. The THG response as measured with an incident laser radiation is 2.5 times that of a control film sample which does not have a content of silver colloid.

EXAMPLE IV

This Example illustrates the preparation of an isotropic 50/50 copolymer of 4-[4-methacroyloxypiperidyl]-4'-nitrostilbene and butyl methacrylate.

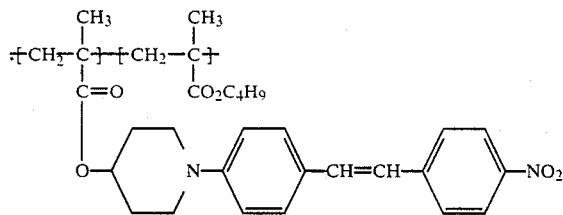

A. 4-(4-Hydroxypiperdyl)benzaldehyde

A 2 liter three necked flask fitted with a mechanical stirrer, thermometer and condenser is charged with 180 g of 4-hydroxypiperidine, 74.4 g of 4-fluorobenzaldehyde, 1 ml of Aliquot 336, 750 ml of dimethylsulfoxide and 82.8 g of anhydrous potassium carbonate. The mixture is heated at 95° C. for three days, then the product mixture is cooled and poured into 3 liters of ice water. The resultant solid precipitate is filtered, washed with water, and vacuum dried. The crude product is recrystallized from toluene, m.p. 115°–118° C.

B. 4-(4-Hydroxypiperidyl)-4'-nitrostilbene

A one liter three necked flask fitted with a dropping funnel, mechanical stirrer and condenser is charged with 34.35 g of 4-nitrophenylacetic acid. Piperidine (16.2 g) is added dropwise over a period of 30 minutes. At the end of the addition, 38.4 g of 4-(4-hydroxypiperidyl)benzaldehyde is added. The reaction mixture is heated at 100° C. for three hours, and at 130° C. for three hours. After cooling, the semi-solid product mass is ground in ethanol in a blender, then filtered, washed, and vacuum dried. The crude product is recrystallized from chlorobenzene, m.p. 248°–250° C.

C. 4-(4-Methacroyloxypiperidyl)-4'-nitrostilbene

A one liter three necked flask fitted with a thermometer, condenser, dropping funnel with argon inlet, and magnetic stirrer, is charged with 5 g of 4-(4-hydroxypiperidyl)-4'-nitrostilbene, 5 g of triethylamine and 400 ml of dichloromethane. The mixture is heated to 35° C., and 3.2 g of methacroyl chloride is added dropwise over a 30 minute period. After stirring at 35° C. for 4 hours, another 3.2 g of methacroyl chloride is added, and the mixture is stirred for about 18 hours at 35° C. The product mixture then is extracted three times with distilled water, and the organic phase is dried over magnesium sulfate, and the solvent is evaporated. The resultant crude product is recrystallized from acetonitrile, m.p. 175°-176° C.

D. 50/50 Istropic Acrylic Copolymer 4-(4-Methacroyloxypiperidyl)-4'-nitrostilbene (2 g) is suspended in 20 ml of chlorobenzene, and the mixture is degassed one hour. To the suspension are added 0.724 g of butyl methacrylate (7.24 ml of a 10% solution in chlorobenzene) and one mole percent of azobisisobutyronitrile.

The reactor is capped and placed in a 75° C. oil bath for a period of about 18 hours. The product mixture then is poured into methanol to precipitate the copolymer. The solid copolymer is recovered by filtration, and vacuum dried.

The polymer has a weight average molecular weight in the range of 60,000-80,000, and exhibits a $T_g$ of 150° C.

EXAMPLE V

This Example illustrates a poling procedure for producing a transparent film of a polymer/metal colloid composite copolymer which exhibits second order nonlinear optical response in accordance with the present invention.

A. Poling Cell Construction

A poling cell is constructed using an electrically conductive glass plate as a substrate, such as Corning Glass EC-2301. The glass plate is washed with sulfuric acid, isopropanol, 1-dodecanol, and isopropanol, with a distilled water rinse between each washing step.

A thin film of a buffer layer of polysiloxane of 0.8 micron thickness is deposited by a spin coating process on the cleaned conductive glass plate. The spin coating process involves covering the glass plate with a 10% by weight solution of polysiloxane in isobutanol, spinning the glass at a rotational speed of 3500 rpm, and then drying the film at 120° C. for 4 hours in a nitrogen atmosphere.

When the lower buffer layer film is sufficiently hardened, a thin film of 2 micron thickness of the Example IV 50/50 copolymer of 4-(4-methacroyloxypiperidyl)-4'-nitrostilbene and butyl methacrylate as a control sample is deposited on the buffer film by spin coating. The spin coating is accomplished by covering the buffer surface with a 15% by weight solution of the polymer in 1,2,3-trichloropropane, spinning at 2000 rpm, and then drying the film at 110° C. for 16 hours in a nitrogen atmosphere.

Another buffer layer of 0.8 microns of polysiloxane is deposited on top of the hardened polymer film by spin coating. On the hardened upper layer, a thin layer of gold of about 1000 Angstrom thickness is deposited using a thermal evaporation process. A gold thin film is employed as one of the electrodes for poling the polymer. Two electrical wires then are attached to the conductive glass plate and the gold film utilizing electrically conductive expoy adhesive.

The procedure is repeated, except that the copolymer matrix has a 15 ppm of silver colloid of the type described in Example I.

B. Electric Field-Induced Orientation

The poling assembly is placed in a microscope hot stage (Mettler FP-82 with FP-80 Central Processor), and the sample is observed with a polarizing microscope (Leitz Ortholux Pol) for alignment. The two lead wires are connected to a DC voltage source (Kepco OPS-3500), which generates a voltage signal up to 3500 V.

The poling cell is first heated to 150° C. to bring the acrylic copolymer to the melt phase. The DC voltage source is slowly turned up to 400 V. The field strength is calculated to be approximately $1.1 \times 10^{-6}$ V/cm. The sample is maintained at this field strength level for a period of about two seconds or longer as necessary to achieve the molecular alignment. This is followed by a rapid cooling to about 30° C. while the field is still applied. When the sample reaches 30° C., the voltage source is disconnected. A noncentrosymmetrically oriented acrylic copolymer matrix is obtained by the poling procedure.

The $\chi^{(2)}$ value for the control acrylic copolymer nominally is $165 \times 10^{-9}$ esu as measured at 1.34 micron excitation wavelength laser. A comparative $\chi^{(2)}$ value for potassium hydrogen phosphate is $2.4 \times 10^{-9}$ esu.

The $\chi^{(2)}$ value for the acrylic copolymer/silver colloid composite film nominally is $300 \times 10^{-9}$ esu.

The poling procedures are repeated with a polymethyl methacrylate/4-N,N-dimethyl-4'-nitrostilbene/gold colloid (10 ppm) film in comparison with a control film without a gold colloid content. An enhancement of the $\chi^{(2)}$ value is observed for the gold colloid composite film.

What is claimed is:

1. A nonlinear optical medium which is a composite comprising (1) a polymer matrix of a side chain polymer which exhibits nonlinear optical response; (2) about 5-30 weight percent, based on the composite weight, of an organic compound which exhibits nonlinear optical response; and (3) about 0.001-5 weight percent, based on the composite weight, of a metal colloid which is uniformly dispersed in the polymer matrix, wherein the metal colloid has an average particle diameter in the range between about 10-1000 angstroms and has a particle surface plasmon frequency in the range between about 300-800 nm.

2. A nonlinear optical medium in accordance with claim 1 wherein the organic compound has a molecular weight less than about 1000.

3. A nonlinear optical medium in accordance with claim 1 wherein the organic compound is 4-nitroaniline.

4. A nonlinear optical medium in accordance with claim 1 wherein the organic compound is 2-methyl-4-nitroaniline.

5. A nonlinear optical medium in accordance with claim 1 wherein the organic compound is 4-N,N-dimethylamino-4'-nitrostilbene.

6. A nonlinear optical medium in accordance with claim 1 wherein the metal colloid is a silver colloid.

7. A nonlinear optical medium in accordance with claim 1 wherein the metal colloid is a gold colloid.

8. A nonlinear optical medium in accordance with claim 1 wherein the metal colloid is a silver-gold cluster colloid.

* * * * *